(12) United States Patent
Aten

(10) Patent No.: US 9,212,624 B2
(45) Date of Patent: Dec. 15, 2015

(54) AIRCRAFT NACELLES, CASCADE ASSEMBLIES HAVING COUPLING CATCHES, AND THRUST REVERSER SYSTEMS

(71) Applicant: ROHR, INC., Chula Vista, CA (US)

(72) Inventor: Michael Aten, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 405 days.

(21) Appl. No.: 13/888,218

(22) Filed: May 6, 2013

(65) Prior Publication Data
US 2014/0325957 A1 Nov. 6, 2014

(51) Int. Cl.
*F02K 1/72* (2006.01)
*F02K 1/76* (2006.01)

(52) U.S. Cl.
CPC . *F02K 1/72* (2013.01); *F02K 1/766* (2013.01); *Y02T 50/671* (2013.01)

(58) Field of Classification Search
CPC ............ F02K 1/56–1/625; Y10T 403/587; Y10T 24/45089; Y10T 24/45094; F16M 13/005; F05D 2260/30
USPC ......... 60/226.2, 230; 244/110 B; 248/221.11, 248/221.12, 223.41, 225.21, 554
See application file for complete search history.

(56) References Cited

U.S. PATENT DOCUMENTS

| | | | | |
|---|---|---|---|---|
| 4,922,713 A * | 5/1990 | Barbarin | .................... | F02K 1/72 239/265.31 |
| 6,256,980 B1 * | 7/2001 | Lecordix | .................... | F02K 1/72 239/265.29 |
| 6,434,927 B1 * | 8/2002 | Stretton | .................... | F02K 1/72 239/265.31 |
| 8,899,013 B2 * | 12/2014 | Hurlin | ........................ | F02K 1/72 244/110 B |
| 2009/0151320 A1 * | 6/2009 | Sternberger | .............. | F02K 1/72 60/226.2 |
| 2010/0212286 A1 * | 8/2010 | West | ......................... | F02K 1/32 60/226.2 |
| 2015/0204272 A1 * | 7/2015 | James | ....................... | F02K 1/72 239/265.19 |

* cited by examiner

*Primary Examiner* — Phutthiwat Wongwian
*Assistant Examiner* — Alain Chau
(74) *Attorney, Agent, or Firm* — Snell & Wilmer, LLP

(57) ABSTRACT

A cascade assembly is provided for installation in an aircraft nacelle. The cascade assembly comprises a first cascade portion fixed to a non-movable portion of the nacelle. The first cascade portion comprises a bracket. A second cascade portion is fixed to a translating sleeve portion of the nacelle. The second cascade portion comprises a catch. The bracket is configured to receive the catch in response to the translating sleeve portion being in a deployed position.

17 Claims, 4 Drawing Sheets

AIRCRAFT NACELLES, CASCADE ASSEMBLIES HAVING COUPLING CATCHES, AND THRUST REVERSER SYSTEMS

FIELD

The present disclosure relates to thrust reverser air management and, more particularly, to a system and apparatus for a split cascade.

BACKGROUND

Jet powered aircraft employ thrust reversers to reduce speed during aircraft landing. Thrust reversers generally exhaust fan air in the forward direction to create reverse thrust. Thrust reversers typically employ cascades to direct the exhausted fan air.

SUMMARY

In various embodiments, a cascade assembly comprising a first cascade portion and a second cascade portion may be installed in an aircraft nacelle. The first cascade portion may be fixed, attached or otherwise coupled to a non-movable portion of the nacelle. The first cascade portion may comprise a bracket. The second cascade portion may be fixed, attached or otherwise coupled to a translating sleeve portion of the nacelle. The second cascade portion may comprise a catch. In response to the translating sleeve being deployed (e.g., moved to the aft position when the thrust reverser is activated), the catch may receive the bracket, coupling the first cascade portion to the second cascade portion to form the cascade assembly. In various embodiments, the bracket may comprise an aperture. In various embodiments, the catch may comprise a hook. In various embodiments, the hook may be receivable in the aperture.

In various embodiments, a thrust reverser system capable of being installed in an aircraft nacelle may comprise a cascade and a blocker door system. The cascade may comprise a translating portion and a fixed portion. The translating portion may be coupled to a translating sleeve of a nacelle. The fixed portion may be coupled to a non-translating portion of the nacelle. In response to the translating sleeve being deployed, the translating portion and the fixed portion operatively couple to one another. The blocker door system may be configured to redirect airflow in a fan duct through the translating portion and the fixed portion. In various embodiments, the translating portion may comprise a bottom surface that defines a first plane. Similarly, the fixed portion may comprise a top that defines a second plane. In various embodiments, the first plane may substantially parallel to the second plane. In various embodiments, the first plane may be out of phase with the second plane.

In various embodiments, a nacelle comprises a translating sleeve, a translating cascade and a fixed cascade. The translating sleeve may be deployable between a stowed position and an active position. The translating cascade may comprise a first catch. The translating cascade may be mounted to the translating sleeve. The fixed cascade may comprise a second catch. The fixed cascade may be coupled to a non-moveable portion of the nacelle. In response to the translating sleeve being in the active position (e.g., moved aft), the first catch may engage the second catch to join the translating cascade with the fixed cascade.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
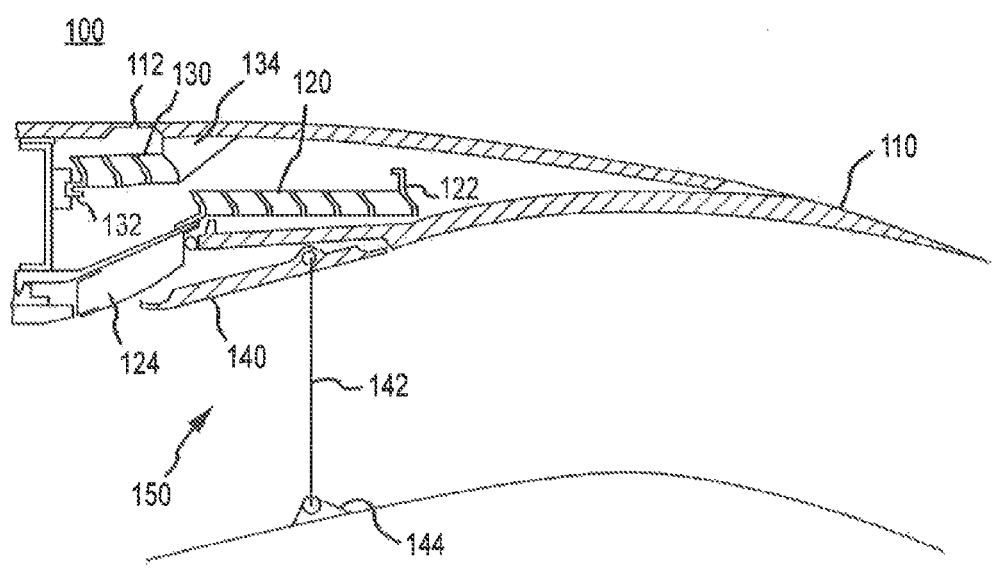
FIG. 1A illustrates a cross-sectional view of an aircraft nacelle in a stowed configuration in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

In various embodiments, a split cascade system and apparatus (collectively, the "split cascade") may reduce the package size of a cascade structure providing for additional clearance in the nacelle. More specifically the split cascade may comprise two or more cascade pieces. For example, the split cascade may comprise one or more fixed cascade elements. The split cascade may also comprise one or more translating cascade elements (e.g., moveable elements). The fixed cascade elements may be installed on a non-moveable portion of the nacelle housing. The translating cascade elements may be installed on a translating sleeve of the nacelle. In response to the translating sleeve being moved to an aft position (e.g., the position corresponding to the thrust reverser being activated), the translating cascade element may move aft and engage, couple or otherwise join the fixed cascade element creating a cascade assembly. The cascade assembly may direct fan air flow diverted to the cascade by a blocker door while the thrust reverser is activated (e.g., during landing or any other suitable aircraft slow down event).

Conventional cascades may comprise a single piece matrix of passages that are configured to direct air flow during a thrust reverse event. The single piece cascades have a relatively large package size (e.g., overall geometry and/or volume) that occupies volume in the nacelle. By reducing the package size (e.g., the stowed length), the split cascade provides more clearance in the nacelle. This additional clearance may provide for improved airflow, larger fan air ducts, smaller nacelles, space for plumbing or wiring, maintenance access, drag reduction, and/or the like.

Figure 1B:
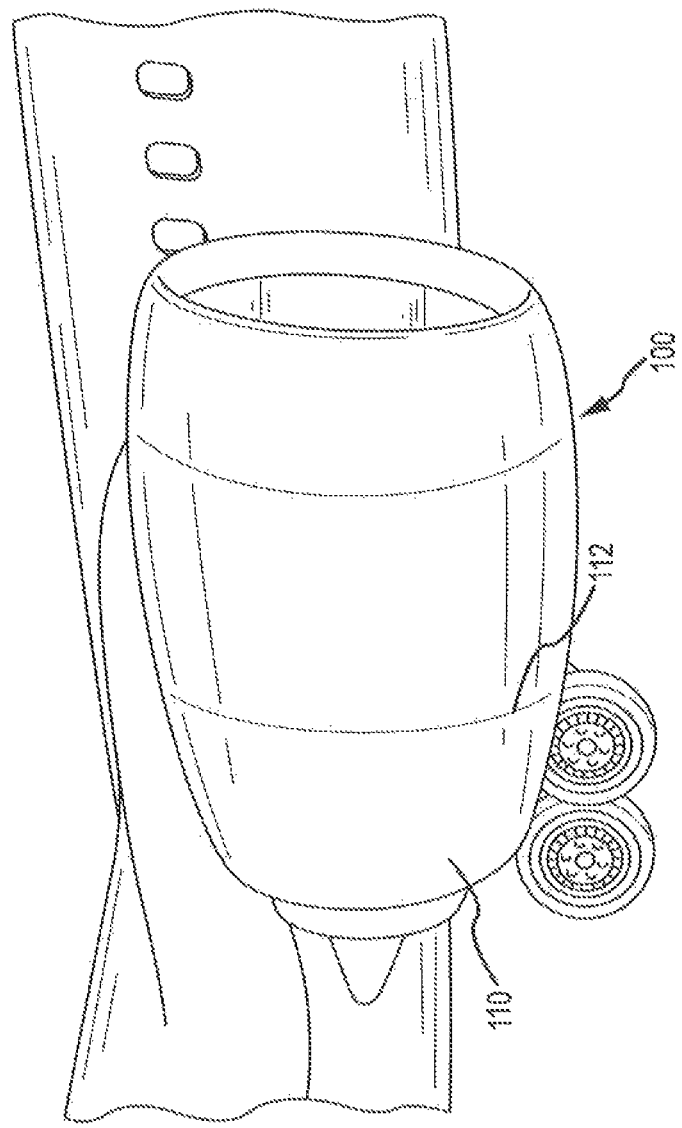
FIG. 1B illustrates a side view of an aircraft nacelle and engine in a stowed configuration installed on an aircraft in accordance with various embodiments.

In various embodiments, and with reference to FIGS. 1A and 1B, nacelle 100 is shown in the stowed position (e.g., with the thrust reverser inactive and nacelle 100 is closed, as shown in FIG. 1B). Nacelle 100 may house or comprise a translating sleeve 110, a fixed cascade 120, a translating cascade 130 that is attached to translating sleeve 110, a blocker door 140 and a fan air duct 150. Split line 112 identifies the separation point or plane of translating sleeve 110 from non-moveable portion of the nacelle 100.

In various embodiments, fixed cascade 120 may be mounted to a non-moveable portion of nacelle 100. Fixed cascade 120 may be mounted in any suitable fashion such as, for example, a support 124. Translating cascade 130 may be coupled to, attached to, fixed to, mounted to, or otherwise supported by translating sleeve 110. For example, translating cascade 130 may be mounted on translating sleeve 110 by a bracket 134. The bracket may be any suitable size, shape, configuration, and/or material.

In the stowed configuration (e.g., when nacelle 100 is closed as shown in FIG. 1B), translating cascade 130 may be stowed separately or apart from fixed cascade 120. Translating cascade 130 may be stowed in any portion of nacelle 100.

Figure 2A:
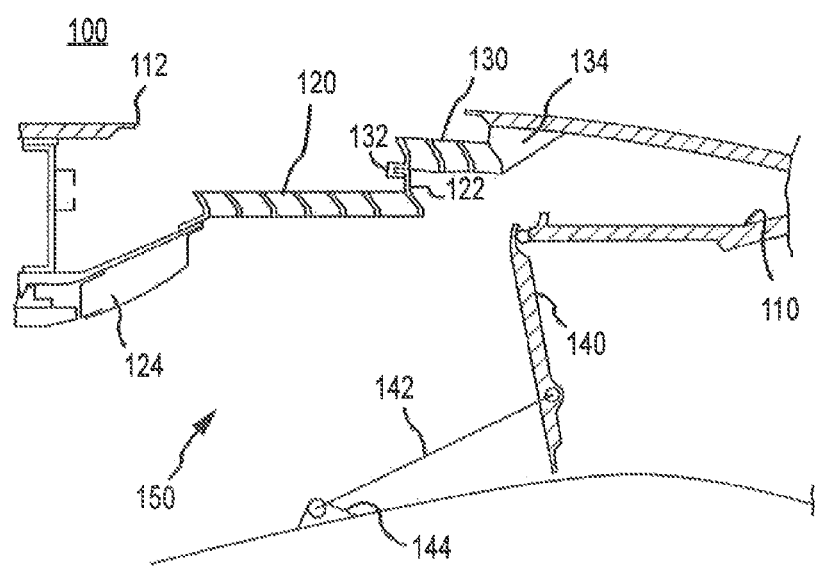
FIG. 2A illustrates a cross-sectional view of an aircraft nacelle in a thrust reverser deployed configuration in accordance with various embodiments.
Figure 2B:
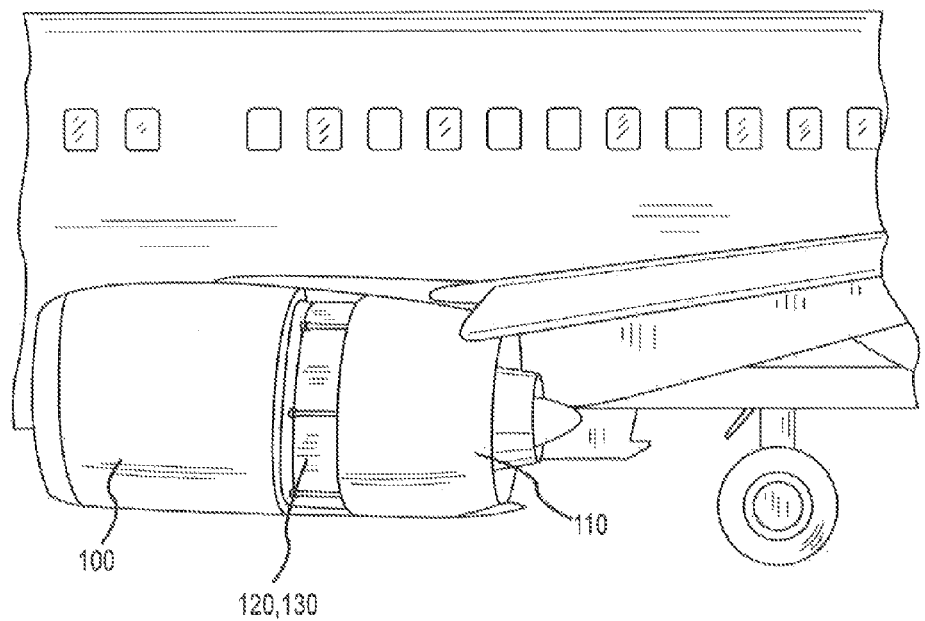
FIG. 2B illustrates a side view of an aircraft nacelle and engine in a thrust reverser deployed configuration installed on an aircraft in accordance with various embodiments.

In various embodiments, and with reference to FIGS. 2A and 2B, translating cascade 130 may comprise a catch 132. Similarly, fixed cascade 120 may comprise a catch 122. In response to translating sleeve 110 deploying (e.g., moved aft, as shown in FIG. 2B), catch 132 may engage or couple with catch 122. In this manner, translating cascade 130 and fixed cascade 120 are coupled together to form a cascade assembly. Catch 132 and catch 122 may also be configured to align translating cascade 130 and fixed cascade 120.

In various embodiments, catch 132 may be any suitable structure or portion of a structure configured to interlock to another structure. For example, catch 132 may be a hook, bracket, aperture, flange, and/or the like. Similarly, catch 122 may be any suitable structure or portion of a structure configured to interlock to another structure. For example, catch 122 may be a hook, bracket, aperture, flange, and/or the like. More specifically, in various embodiments, catch 132 and catch 122 may be configured as mating structures. For example, catch 132 and catch 122 may be complimentary, such that, they combine, interlock, couple, support, or otherwise mate with one another while translating sleeve 110 is in a deployed position, as shown in FIG. 2B.

In various embodiments, translating cascade 130 and fixed cascade 120 may be aligned or otherwise deployed in a complimentary arrangement while translating sleeve 110 is in a deployed position. For example, an aft portion of fixed cascade 120 may generally define a plane. Similarly, a forward surface of translating cascade 130 may generally define plane. In the deployed position (e.g., translating sleeve 110 moved aft), the plane associated with fixed cascade 120 may align with the plane associated with translating cascade 130. In this manner, fixed cascade 120 and translating cascade 130 may generally align to form a single, uniform cascade assembly to direct air when the thrust reverser is active.

In various embodiments, translating cascade 130 and fixed cascade 120 may be arranged in or otherwise deployed in a complimentary arrangement while translating sleeve 110 is in a deployed position. For example, a top portion of fixed cascade 120 may generally define a plane. Similarly, a bottom surface of translating cascade 130 may generally define a plane. In the deployed position (e.g., translating sleeve 110 moved aft), the plane associated with fixed cascade 120 may be substantially parallel with the plane associated with translating cascade 130. In this manner, fixed cascade 120 and translating cascade 130 may be generally parallel with one another, but out of phase (e.g., not aligned, as shown in FIG. 2A).

In various embodiments, and in response to a thrust reverser system being activated, translating sleeve 110 may move aft, separating from nacelle 100 along split line 112. The aft movement of translating sleeve 110 may cause translating cascade 130 to move aft and engage, couple, or otherwise join fixed cascade 120, causing catch 132 to mate with, join, and/or otherwise engage catch 122. The aft movement of translating sleeve 110 may also cause blocker door 140 to deploy into a fan duct 150. Blocker door 140 is actuated in fan duct 150 in response to the aft motion of translating sleeve 110, causing a drag link 142 retained in fan duct 150 by a bracket 144 to rotate blocker door 140 into fan duct 150. Blocker door 140 at least partially seals and/or redirects air flow in fan duct 150 through the cascade assembly (e.g., fixed cascade 120 and translating cascade 130).

In various embodiments, fixed cascade 120 may be any suitable shape or size. Fixed cascade 120 may also be configured to direct or control the flow of fan air (e.g., when the thrust reverser is active) in any suitable fashion. Similarly, translating cascade 130 may be any suitable shape or size. Translating cascade 130 may also be configured to direct or control the flow of fan air (e.g., when the thrust reverser is active) in any suitable fashion.

In various embodiments, the split cascade described herein may be employed on, installed on, or otherwise used with any suitable nacelle, engine, and/or thrust reverser system.

Thus, in various embodiments, the split cascade described herein reduces the package size of the cascade structure, creating greater clearance in an aircraft nacelle.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cascade assembly for installation in an aircraft nacelle, comprising:
   a first cascade portion fixed to a non-movable portion of the aircraft nacelle, wherein the first cascade portion comprises a bracket; and
   a second cascade portion fixed to a translating sleeve portion of the aircraft nacelle, wherein the second cascade portion comprises a catch,
   wherein the bracket is configured to receive the catch, in response to the translating sleeve portion being in a deployed position.

2. The cascade assembly of claim 1, wherein the first cascade portion and the second cascade portion form the cascade assembly, in response to the translating sleeve portion being in the deployed position.

3. The cascade assembly of claim 1, wherein the deployed position is achieved, in response to the translating sleeve portion being moved to an aft position.

4. The cascade assembly of claim 1, wherein the bracket comprises an aperture.

5. The cascade assembly of claim 4, wherein the catch is a hook.

6. The cascade assembly of claim 5, wherein the hook is receivable in the aperture.

7. The cascade assembly of claim 1, wherein the first cascade portion comprises an aft surface and the second cascade portion comprises a forward surface, and wherein the aft surface and the forward surface are aligned, in response to the translating sleeve portion being in the deployed position.

8. A thrust reverser system capable of being installed in an aircraft nacelle, comprising:
   a cascade assembly comprising;
      a translating portion coupled to a translating sleeve of the aircraft nacelle;
      a fixed portion coupled to a non-translating portion of the aircraft nacelle,
      wherein the translating portion and the fixed portion operatively couple to one another, in response to the translating sleeve being in a deployed position;
      wherein the translating portion comprises a first bracket;
      wherein the fixed portion comprises a second bracket; and
      wherein the first bracket is configured to catch the second bracket, in response to the translating sleeve being in the deployed position; and
   a blocker door system configured to redirect airflow in a fan duct, wherein the blocker door system is deployable, in response to the translating sleeve being in the deployed position.

9. The thrust reverser system of claim 8, wherein the translating portion comprises a bottom that defines a first plane, and wherein the fixed portion comprises a top that defines a second plane.

10. The thrust reverser system of claim 9, wherein the first plane is substantially parallel to the second plane.

11. The thrust reverser system of claim 9, wherein the first plane is out of phase with the second plane.

12. The thrust reverser system of claim 8, wherein the translating portion is stowed in the aircraft nacelle in response to the translating sleeve being in a forward position.

13. A nacelle, comprising:
   a translating sleeve deployable between a stowed position and an active position;
   a translating cascade comprising a first catch, wherein the translating cascade is mounted to the translating sleeve;
   a fixed cascade comprising a second catch, wherein the fixed cascade is coupled to a non-moveable portion of the nacelle,
   wherein the first catch engages the second catch to join the translating cascade to the fixed cascade, in response to the translating sleeve being in the active position.

14. The nacelle of claim 13, wherein the active position is the position of the translating sleeve when a thrust reverser is activated.

15. The nacelle of claim 13, wherein the first catch is a hook and the second catch is an aperture.

16. The nacelle of claim 13, wherein the translating cascade comprises a front surface and the fixed cascade comprises an aft surface, and wherein the front surface is substantially aligned with the aft surface in response to the translating sleeve being in the active position.

17. The nacelle of claim 13, further comprising a blocker door and a fan duct, wherein the blocker door is configured to divert at least a portion of the airflow in the fan duct through the translating cascade and the fixed cascade in response to the translating sleeve being in the active position.

* * * * *